(12) United States Patent
Schmalz

(10) Patent No.: US 6,300,766 B1
(45) Date of Patent: Oct. 9, 2001

(54) APPARATUS SENSITIVE TO ARC AMPLITUDE FOR ENVELOPE DETECTION OF LOW CURRENT ARCS

(75) Inventor: Steven Christopher Schmalz, Greenfield, WI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/122,563

(22) Filed: Jul. 24, 1998

(51) Int. Cl.[7] .................. H01H 9/50; G01R 31/08; G01R 22/00
(52) U.S. Cl. .................. 324/536; 324/522; 324/76.17
(58) Field of Search .................. 324/536, 520, 324/521, 522, 541, 544, 76.17, 433, 435, 76.12

(56) References Cited

U.S. PATENT DOCUMENTS

| | | | |
|---|---|---|---|
| 5,224,006 | 6/1993 | MacKenzie et al. | 361/45 |
| 5,691,869 | 11/1997 | Engel et al. | 361/42 |
| 5,818,237 | * 10/1998 | Zuercher et al. | 324/536 |

* cited by examiner

*Primary Examiner*—Safet Metjahic
*Assistant Examiner*—Anjan K Deb
(74) *Attorney, Agent, or Firm*—Martin J. Moran

(57) ABSTRACT

An arcing fault detector band pass filters the ac current in a protected circuit to generate a sensed current signal with pulses having an amplitude related to the step increases in current produced each time an arc is struck. The envelope of this pulse signal is tracked by a first, slow tracking circuit or envelope detector having a first, long time constant and a second, fast tracking circuit having a second, shorter time constant. When the second tracking signal generated by the second tracking circuit falls below a predetermined fraction of the first tracking signal of the first tracking circuit, a charge pulse modulator generates a pulse of a size which is a function of the amplitude of the most recent pulse in the sensed current signal. When a time attenuated accumulation of the charge pulses maintained on an integrating capacitor reaches a preselected level, an output circuit generates an arcing fault indication.

6 Claims, 4 Drawing Sheets

APPARATUS SENSITIVE TO ARC AMPLITUDE FOR ENVELOPE DETECTION OF LOW CURRENT ARCS

BACKGROUND OF THE INVENTION

1. Field of the Invention

This invention relates to apparatus for detecting arcing faults in ac electrical systems, and, in particular, to such apparatus which tracks and is sensitive to the amplitude of the step changes in current produced by arcing faults.

2. Background Information

It has become recognized that conventional overcurrent protection devices for ac electrical systems such as circuit breakers and overload relays typically do not respond to arcing faults. Such faults often have a high resistance so that the fault current is below the instantaneous trip current of such protection devices. Arcing faults in ac systems also tend to be intermittent so that they do not generate the time integrated values of current needed to activate the delayed trip feature in the typical circuit protection.

A common approach to arcing fault detection recognizes that the arc current is considerably distorted from a pure sine wave. For instance, it contains considerable high frequency noise. In addition, there can be intervals of no current and/or periods of short circuit current. Devices which combine various of these characteristics of arc current have been proposed for arc detectors. Some of them require microcomputers to apply the various criteria to the current wave form. Generally, this makes such detectors too expensive for widespread use. In addition, many common loads have capacitors or transformers on their inputs which filter the high frequency noise.

Another approach to arc fault detection relies on the fact that an arc between spaced conductors or a gap in a conductor can only be struck when the voltage rises to the break down voltage across the space or gap. Thus, these detectors respond to the step increase in current produced by arc initiation. Such a detector is described in U.S. Pat. No. 5,224,006. In order to avoid false trips produced by the inrush currents at turn on of some typical loads, another detector of this type described in U.S. Pat. No. 5,940,256 looks for a plurality of step increases in current within a certain time interval characteristic of an arcing fault which repetitively strikes and is interrupted. A further improvement on this type of detector, which generates a time attenuated integration of pulses representative of step increases in current such as those generated by arcing faults, is described in U.S. Pat. No. 5,691,869.

Any arcing fault detector must be able to discriminate between a true arcing fault and wave form distortion produced by normal loads. One such load is a dimmer. A dimmer phases back the half cycles of the ac voltage creating repetitive step increases in current. The above-described arcing fault detectors which respond to a plurality of step increases in current must have their sensitivities reduced to avoid a false response to dimmners. Adding to the problem, a dimmer energizing a tungsten lamp can generate inrush pulses with an amplitude ten times steady state current when the filament is cold.

U.S. Pat. No. 5,818,237 discloses an arcing fault detector which responds to low amplitude arcing faults without generating false indications in response to a dimmer or the spikes generated by turn-on of a cold tungsten bulb. This detector looks for randomness in the envelope of a sensed current signal containing pulses for the step increases in current caused by the striking of an arc. In one such detector, the envelope of the pulse signal is tracked by a first tracking circuit with a first time constant to generate a first tracking signal, and a second tracking circuit tracking the sensed current signal with a second time constant which is shorter than the first time constant to generate a second tracking signal. An output signal is generated when the second tracking signal decays to a predetermined fraction of the first tracking signal. As a dimmer generates a step increase in current on each half cycle, the time constants and the fraction can be selected such that the second tracking signal never falls to the predetermined fraction of the first tracking signal in response to a dimmer. On the other hand, the random repetition of step increases in current produced by an arcing fault results in intervals where the second tracking signal will fall to the predetermined fraction of the first tracking signal and produce an output. The second tracking signal must fall to the predetermined fraction of the first tracking signal a selected number of times within a pre-scribed time interval before an indication of an arcing fault is generated in order to distinguish over singular events. In another embodiment of this detector, envelope detection is combined with generation of a time attenuated accumulation of pulses generated by the step increases in current caused by striking of an arc as in the detector of U.S. Pat. No. 5,691,869. The sensitivity to arcing faults is increased by additionally incrementing the time attenuated accumulation by adding a pulse to the accumulation each time the fast envelope tracking signal falls to the predetermined fraction of the slow envelope tracking signal.

The detector of U.S. Pat. No. 5,818,237 generates fixed pulses when the second tracking signal falls to the selected fraction of the first tracking signal. While this approach works reasonably well, there is room for improvement. In particular, there is a desire to increase the sensitivity of envelope detection tpe arc detectors to low current arcs without sacrificing reaction time for the higher current, more dangerous arcing faults.

SUMMARY OF THE INVENTION

The invention satisfies the above desire and others by providing an envelope-type arc fault detector which is sensitive to the amplitude of the arcing current. More particularly, the invention is directed to apparatus for detecting arcing faults which includes current sensing means generating a signal containing a current pulse for each step increase in current detected in the ac electrical system. The current pulse has an amplitude which is a function of the amplitude of the step increase. The detector also includes means for detecting the randomness in the current pulses comprising first tracking means with a first time constant integrating the current pulses to generate a first tracking signal and second tracking means with a second time constant shorter than the first time constant integrating the current pulses to generate a second tracking signal. This randomness detector means further includes means generating a charge pulse having a value which is a function of the amplitude of the most recent of the current pulses when the second tracking signal falls to a selected fraction of the first tracking signal. Output means maintains a time attenuated accumulation of the charge pulses and generates an arcing fault indication when the time attenuated accumulation reaches a predetermined value.

Preferably, the means generating the charge pulses comprises means responsive to the first tracking signal and the second tracking signal and generating a charge pulse as a function of the amplitude of the first tracking signal at the time that the second tracking signal falls below the predetermined fraction of the first tracking signal. More particularly, the means generating the charge pulse includes a comparator which changes output when the second tracking signal falls below the predetermined fraction of the first tracking signal. It further includes means such an operational amplifier which generates a step change in output when the comparator changes state as the second tracking signal falls below the predetermined fraction of the first tracking signal. This step change in output of the op amp has an amplitude which is proportional to the amplitude of the first tracking signal. A high pass filter produces a charging pulse from this step change.

Preferably, the output means includes a capacitor in which the charge pulses are accumulated and adjusting means adjusting the charge on the capacitor in an opposite sense to that of the charge pulses. In the preferred embodiment, the adjusting means charges the capacitor and a switch responsive to the charge pulses applies the charge pulses to reduce the charge on the capacitor. When the voltage on the capacitor falls to a preselected value, the arc fault indication is generated.

BRIEF DESCRIPTION OF THE DRAWINGS

A full understanding of the invention can be gained from the following description of the preferred embodiments when read in conjunction with the accompanying drawings in which:

FIG. 1a illustrates a current waveform subject to arcing faults.

FIG. 1b illustrates the first derivative of the current waveform of FIG. 1a.

FIG. 1c illustrates a first envelope tracking signal tracking the signal of FIG. 1b with a first, slow time constant.

FIG. 1d illustrates a second envelope tracking signal tracking the signal of FIG. 1b with a second, fast time constant.

FIG. 1e illustrates an output signal which goes high when the second envelope tracking signal of FIG. 1d falls below the first envelope tracking signal of FIG. 1c.

FIG. 2a illustrates a current waveform of a dimmer operating in a half wave mode for energizing a cold tungsten load.

FIG. 2b illustrates the pulse waveform which is the first derivative of the waveform shown in FIG. 2a.

FIG. 2c illustrates a first, envelope tracking signal tracking the signal of FIG. 2b with a first, slow time constant.

FIG. 2d illustrates a second, envelope tracking signal tracking the signal of FIG. 2b with a second, fast time constant.

FIG. 2e illustrates an output signal generated from the signals of FIGS. 2c and 2d.

DESCRIPTION OF THE PREFERRED EMBODIMENTS

Figure 1:
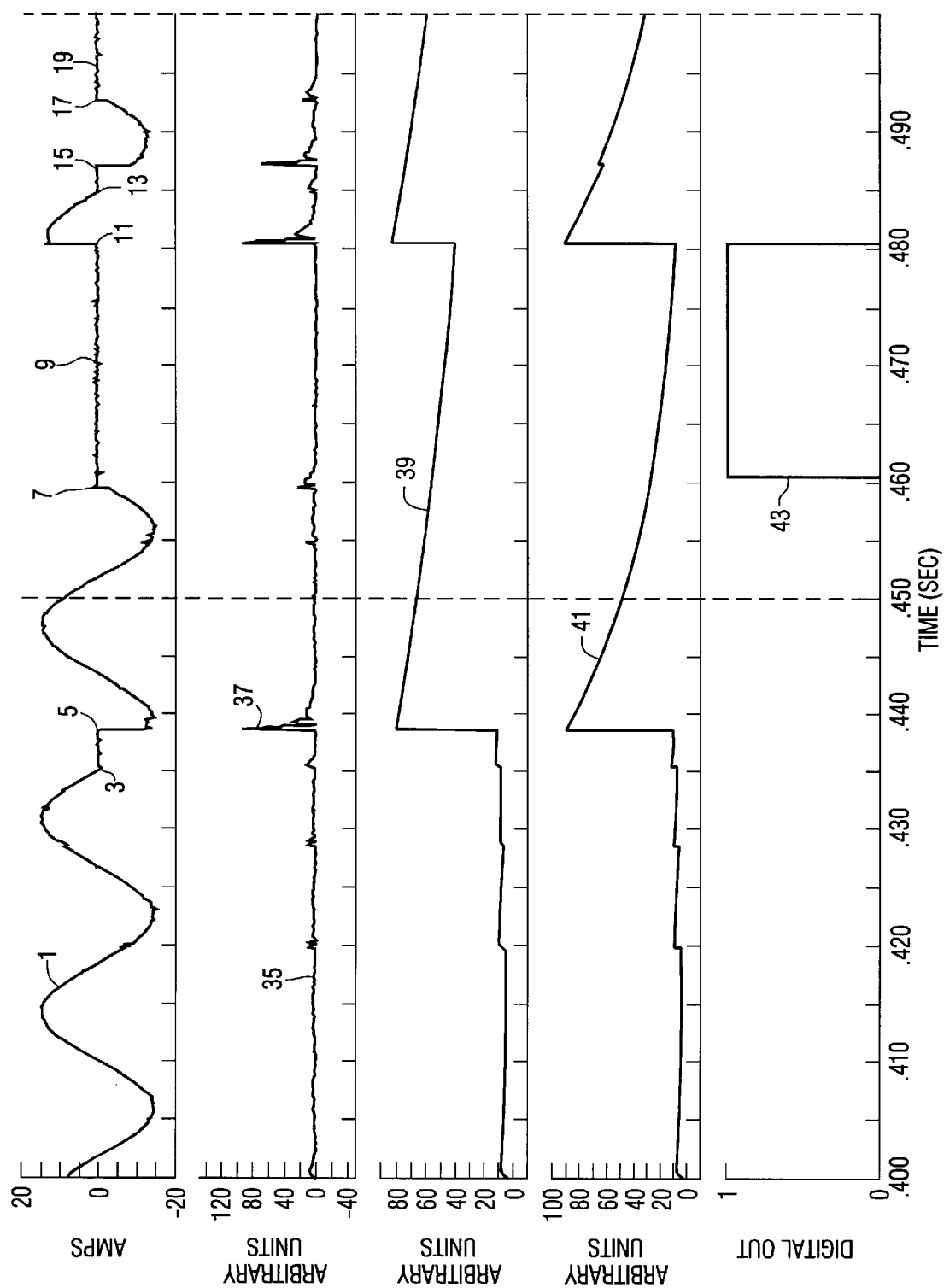

Referring to FIG. 1a which illustrates a current waveform 1 in a typical ac electrical system subject to a series arcing fault, it can be seen that a series of random discontinuities occur in the current. For instance, a gap in the conductor carrying the current, such as can be caused by cutting of the conductor, results in the current terminating at the zero crossing 3 and remaining at zero until the voltage rises sufficiently to restrike an arc across the gap. This causes the current to rise rapidly as a step function at 5 and then resume a sinusoidal pattern which can continue even through zero crossings. If conditions are reached where the arc cannot be maintained, another discontinuity occurs such as at 7. In the example shown, an open circuit is maintained at 9 until the voltage reaches the arc voltage and the arc is restruck at 11. In this example, the arc is extinguished at the zero crossing 13, but is restruck again on the next half cycle at 15. The voltage then falls below the arcing voltage at 17 resulting in another open circuit condition at 19. The current waveform shown in FIG. 1a is an example of a typical current waveform in an ac circuit subject to arcing, but as can be appreciated, there are an infinite number of other patterns of discontinuities that can occur in such a circuit. The purpose of FIG. 1a is to illustrate that these discontinuities occur randomly.

Figure 2:
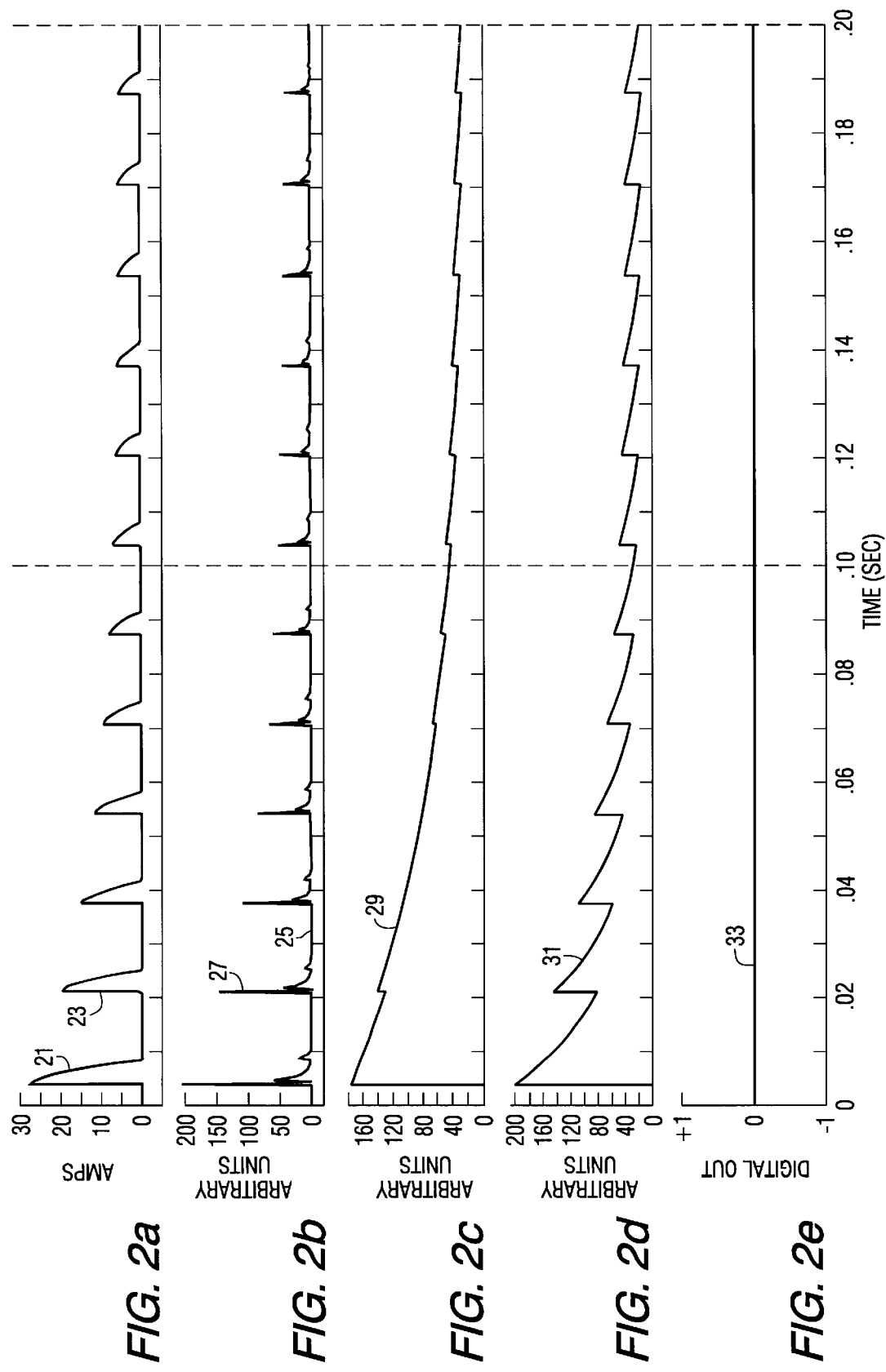

As discussed above, certain types of arc detecting circuits such as that described in U.S. Pat. No. 5,940,256 look for the step increases in the current caused by the arcing fault and provide an indication of an arcing fault when a predetermined number of such step increases occur within a given time interval. As also mentioned above, there are certain types of loads which can also produce step increases in the ac current. One of the most troublesome for these arc detecting circuits is the dimmer. FIG. 2a shows a current waveform 21 produced in an ac circuit by a dimmer operating on a slightly less than 50% duty cycle to energize a cold tungsten filament. A half wave dimmer, which is the worst case is shown in FIG. 2a. It can be readily appreciated that a fill wave dimmer would produce a mirror waveform for the half cycles of opposite polarity. In any event, it can be seen that such increases in current occur such as at 23 when the dimmer switch turns on. As the dimmer switches on at the same phase angle for each cycle of the ac current, the step increases 23 occur at regular intervals. In the example shown in FIG. 2a, the dimmer is energizing a cold tungsten filament so that it can be seen that the amplitude of the current is initially very high but decays slowly on successive half cycles to a steady state amplitude as the filament warms up.

Current arcing fault detectors which count the step increases in current which occur in a given time interval to detect an arcing fault, must have their sensitivity decreased so that they do not respond to the step increases in current caused by a dimmer such as shown in FIG. 2a. This penalty in sensitivity can be quite high if the inrush currents caused by a cold tungsten filament are not to cause to a false trip.

The detector described in U.S. Pat. No. 5,818,237 provides an improvement in series arcing fault detectors by taking advantage of the fact that the step increases caused by an arcing fault are random in time as opposed to the regular step increases caused by a dimmer. This is accomplished by detecting randomness in the envelope of the current signal. In particular, the current signal is differentiated to generate a di/dt signal containing current pulses in response to step increases in current. A first tracking circuit tracks the di/dt signal with a first time constant. The di/dt signal is also tracked by a second tracking circuit having a second time constant which is shorter than the first time constant to generate a second tracking signal. These two tracking signals are compared and if the second, faster decaying tracking signal reaches a predetermined fraction of the first tracking signal, an output signal indicative of arcing fault is generated. The time constant and fraction are selected such that the repetitively occurring steps in a dimmer current signal regularly reset the tracking circuits so that the second tracking signal never decays to the specified fraction of the first tracking signal. This is illustrated by FIGS. 2b–2d where FIG. 2b illustrates the di/dt signal 25 having a series of regularly spaced pulses 27. FIG. 2c illustrates the first tracking signal 29 which decays at the slower rate and is reset by each of the recurring pulses. Similarly, FIG. 2d illustrates the second tracking signal 31 which, as can be seen, decays more rapidly than the first tracking signal, but is repetitively reset so that it never decays to the selected fraction (in the example, ½) of the first tracking signal amplitude. Thus, as can be seen by FIG. 2e, the output signal 33 remains at zero.

Turning to FIG. 1b, it can be seen that the di/dt signal 35 has randomly spaced current pulses 37 so that the first tracking signal 39 shown in FIG. 1c and the second tracking signal 41 shown in FIG. 1d decay for a long enough period of time that the second tracking signal 41 falls below ½ the amplitude of the first tracking signal thereby causing the output signal 43 in FIG. 1d to go high.

Figure 3:
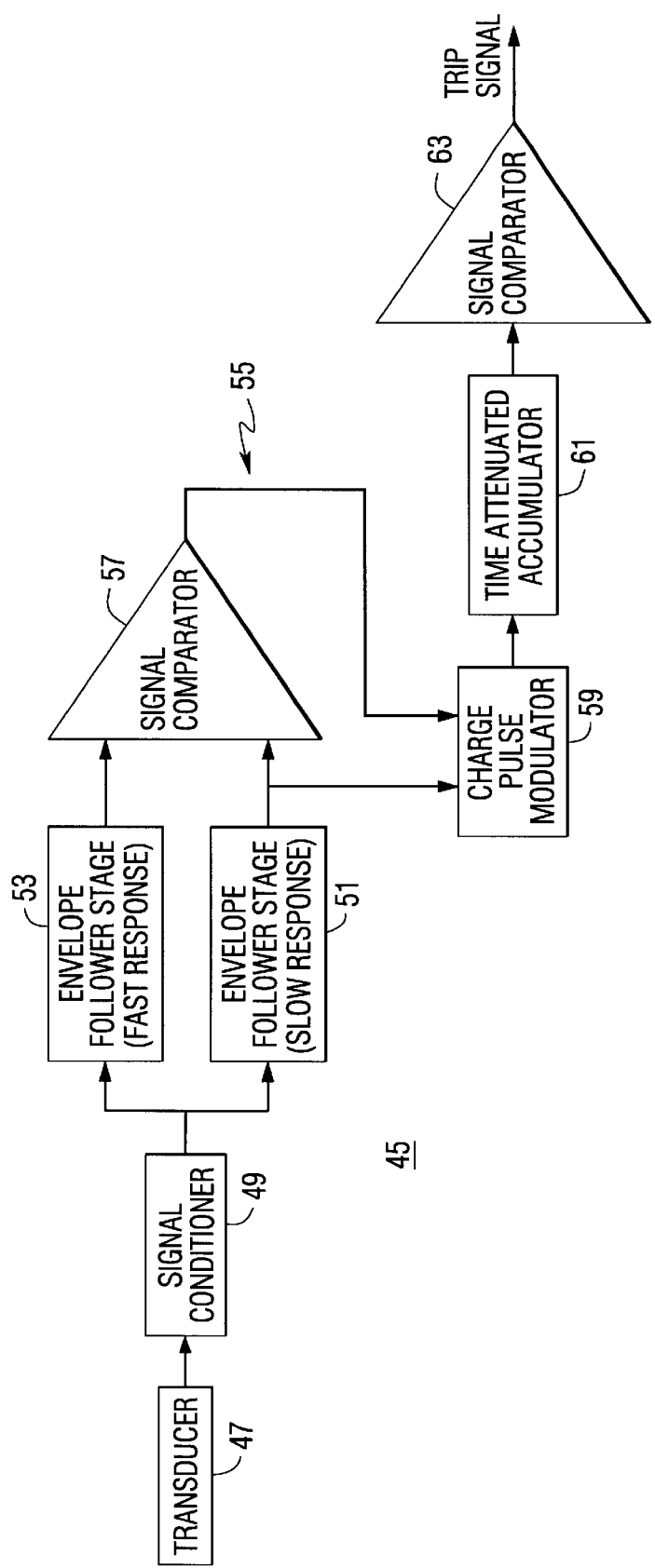
FIG. 3 is a circuit diagram in block form of an arcing fault detector in accordance with the invention.

FIG. 3 is a circuit diagram in block form of an envelope tracking arcing fault detector 45 in accordance with the invention. This detector 45 includes a transducer 47 which senses the current flowing in the ac circuit. In the illustrative circuit, this sensor 47 is a current transformer which generates a di/dt (rate of change of current) signal. The di/dt signal is bandwidth limited and full wave rectified by a signal conditioning amplifier 49 to produce the pulse signals illustrated in FIGS. 1b and 2b. The pulse signal is applied to a first envelope tracking or follower circuit 51 having a first time constant which produces a slow response, first envelope tracking or follower signal, and a second envelope tracking or follower circuit 53 having a second time constant which produces a fast response, second envelope tracking signal illustrated by FIGS. 1d and 2d, respectively.

The first and second tracking signals, produced by the tracking circuits 51 and 53, are applied to a charge pulse generator 55 which includes a signal comparator 57. The signal comparator 57 generates a first output as long as the second tracking signal, generated by the fast response tracking circuit 53, is greater than a predetermined fraction (one-half in the example) of the first tracking signal produced by the tracking circuit 51. When the second tracking signal falls below this predetermined fraction of the first tracking signal, the output of the comparator 57 changes to a second level.

The charge pulse generator 55 also includes a charge pulse modulator 59 which generates a charge pulse each time the output of the signal comparator 57 goes to the second output, or in other words, each time the second tracking signal falls below the predetermined fraction of the first tracking signal. The charge pulse produced by the charge pulse modulator 59 has an amplitude which is proportional to the amplitude of the first tracking signal at the time that the charge puse is generated. As the first tracking signal tracks the peak amplitude of the arc pulses, the amplitude of the charge pulses are a direct function of the amplitude of the arc pulses and, therefore, the amplitude of the step increases detected in the ac current. As a practical matter, due to the long time constant of the first tracking circuit (about six cycles in the exemplary embodiment of the invention) the first tracking signal has not decreased appreciably in amplitude by the time the second tracking signal has decayed to the predetermined fraction of the first tracking signal.

The charge pulses output by the charge pulse modulator 59 are applied to a time attenuated accumulator 61. When the value of the time attenuated accumulation of the charge pulses reaches a predetermined level, as determined by the comparator 63, an arc fault signal is generated. As the charge pulses generated by the charge pulse generator 55 have an amplitude which is related to the amplitude of the step increases produced by the striking of an arc, the arc fault detector of the invention has more sensitivity to low current arcing faults while at the same time maintaining a rapid response to large arcing faults as the latter will generate larger charge pulses which will quickly accumulate to the predetermined value.

Figure 4:
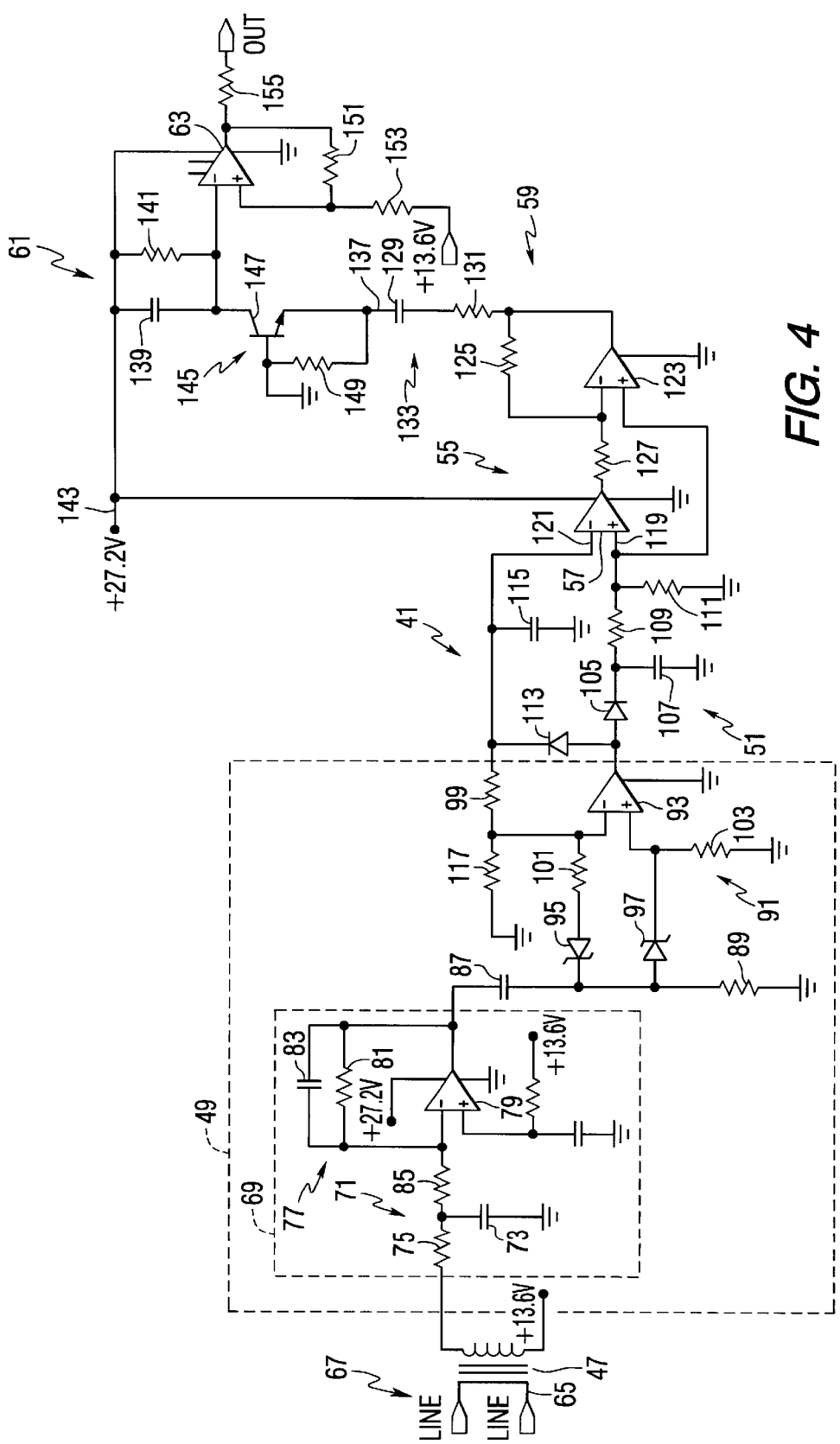
FIG. 4 is a schematic circuit diagram of a particular implementation of the arcing fault detector of FIG. 3.

FIG. 4 illustrates a schematic diagram of a circuit implementing the arc fault detector 45 of FIG. 3. The transducer 47 is a current transformer which generates a signal proportional to current flowing in a conductor 65 of the ac electrical system 67. The signal from the current transformer 47 is applied to the signal conditioner 49 which includes a band pass filter 69. This band pass filter 69 includes a low pass filter 71 formed by shunt capacitor 73 and series resistor 75, and a high pass filter 71 formed apiiaion which includes the op amp 79 with feedback resistor 81 and capacitor 83 and input resistor 85. The band pass filter 69 outputs a signal which is the first derivative, di/dt of the current in the conductor 65. This sensed current signal contains a pulse for each step increase in the current in the conductor 65 such as is produced by the striking of an arc.

Additional attenuation of 60 Hz in the sensed current signal is provided by the series capacitor 87 and shunt resistor 89. The sensed current signal output by the additional high pass filter formed by the capacitor 87 and resistor 89 is full wave rectified by a rectifier circuit 91. This rectifier circuit includes an op amp 93 having oppositely poled diodes 95 and 97 through which the sensed current signal is applied to its inverting and non-inverting inputs. Resistor 99, together with resistor 101 and resistor 103, provide a selected gain for the negative and positive pulses, respectively.

The current transformer 47 and the current conditioning circuit 49 which includes band pass filter 69, additional high pass filter formed by the capacitor 87 and resistor 89, and the full wave rectifier 91, together form a current sensor which generates a sensed current signal having pulses produced for each step increase in current such as that produced by an arc fault. The amplitude of these pulses is a function of the amplitude of the step increase and is, therefore, related to the amplitude of an arcing current.

The first, slow tracking circuit 51 which tracks the envelope of the sensed current signal includes the diode 105, the capacitor 107 and the resistors 109 and 111. The values of the capacitor 107 and resistors 109 and 111 establish the time constant for the first tracking circuit 51. In the exemplary embodiment of the invention, this long time constant is about three cycles of the ac current.

The second, fast tracking circuit 53 includes the diode 113 and capacitor 115. The time constant for the second tracking circuit 53 is set by the values of the capacitor 115, the resistor 99 and the additional resistor 117. The time constant of this second tracking circuit 53 is shorter than the time constant of the first tracking circuit 51, and in the exemplary detector is about one-half cycle of the ac current.

The first tracking signal 119, produced by the first tracking circuit 511, is applied to the non-inverting input of the comparator 57 while the second tracking signal 121 produced by the fast tracking circuit 53 is applied to the inverting input. The comparator 57 compares the voltage on the capacitor 115 of the fast tracking circuit 53 to a fraction of the voltage on the capacitor 107 of the slow tracking circuit 51 set by the relative values of the resistors 109 and 111. In the exemplary detector, the values of these resistors are equal so that the voltage on the capacitor 115 is compared to one-half the voltage on the capacitor 107. As long as the fast tracking signal 121 (the voltage on capacitor 115) is greater than one-half the voltage on the capacitor 107, represented by the tracking signal 119, the output of the comparator 57 is low. When the fast tracking signal falls below the preset fraction (one-half) of the slow tracking signal, the output of the comparator 57 goes high.

The charge pulse modulator 59 includes an op amp 123 having a feedback resistor 125 and an input resistor 127. As long as the second tracking signal 121 is greater than one-half of the first tracking signal so that the output of the comparator 57 is low, the output of the op amp 123 follows the first tracking signal 119. As the time constant of the first tracking signal 51 is relatively long, the output of the op amp 123 is a direct function of the magnitude of the last occurring pulse in the sensed current signal.

When the fast tracking signal falls to the selected fraction of the slow tracking signal, the output of the comparator 57 goes high which immediately drives the output of the op amp 123 to ground. The charge pulse modulator 59 also includes a dc blocking capacitor 129 which, together with the resistor 131, forms a high pass filter 133. This high pass filter 133 converts the step change in the output of the op amp 123 into a charge pulse 137 having an amplitude which is a function of the amplitude of the step change in the output of the op amp 123, and, therefore, is a function of the amplitude of the pulses in the sensed current signal. The first and second tracking circuits 51 and 53, and the charge pulse generator 55 implemented by the comparator 57 and the charge pulse modulator 59 form a randomness detector which detects the randomness in the pulses in the sensed current signal. In response to regularly occurring pulses, such as those produced by a dimmer for every half cycle of the ac current in the electrical system, no charge pulses are generated because the fast tracking signal 121 does not have an opportunity to fall to the selected fraction of the slow tracking signal 119 before both are reset to the same value. On the other hand, arcing faults which occur at random, allow sufficient time for the fast tracking signal to fall to the selected fraction of the slow tracking signal and, therefore, generate a charge pulse, which as noted, has an amplitude which is a function of the amplitude of the pulses in the sensed current signal and, therefore, is a function of the amplitude of the step change in ac current produced by the arc.

The charge pulses 137 are applied to the time attenuated accumulator 61. This time attenuated accumulator 61 includes a capacitor 139 which integrates the charge pulses 137 over time. It further includes an adjustment device for adjusting the charge on the capacitor 139 in the form of a shunt resistor 141. The upper end of the capacitor 139 is connected to the 27.2 volt supply 143 so that normally the voltages at the two electrodes of the capacitor 139 are both at 27.2 volts. A switch 145, formed by a transistor 147, with a base to emitter resistor 149 is connected in series between the lower end of the capacitor 139 and the capacitor 129 at the output of the charge pulse modulator 59. The pulses 137 generated by the charge pulse modulator 59 turn on the transistor 147 to draw charge from the capacitor 139. The amount of charge withdrawn is dependent upon each size of the charge pulse which, in turn, is a function of the amplitude of the pulses in the sensed current signal and, therefore, the step changes in ac current produced by the arc. The capacitor 139, therefore, integrates the charge pulses 137. At the same time, the shunt resistor 141 continuously provides additional charge to the capacitor from the 27.2 volt supply 143. The values of the capacitor 139 and resistor 141 are selected to provide the desired time attenuated accumulation of the charge pulses 137 on the capacitor 139.

The comparator 63 continuously monitors the voltage at the lower end of the capacitor 139. When this voltage falls to a selected value set by the reference voltage applied to the non-inverting input of the comparator 63, the output, which is normally low, goes to the reference voltage, which in the exemplary detector is 13.6 volts. A feedback resistor 151 and input resistor 153 set the gain applied to the reference voltage to generate the output signal indicating detection of an arcing fault which is provided through the output resistor 155.

In summary, step increases in current in the conductor 65 produced by the striking of an arc or other phenomena, such as a dimmer, in the ac electrical system 67, are detected by the current transformer 47, differentiated and bandwidth limited by the band pass filter 69, and full wave rectified by the rectifier circuit 91 to produce a sensed current signal having unipolar first pulses with an amplitude which is a function of the amplitude of the step changes in ac current. This pulse, sensed current signal is tracked by the first tracking circuit 51 with a slow time constant and the second tracking circuit 53 with a fast time constant. When the tracking signal 121 produced by the second, fast tracking circuit falls to a selected fraction of the first, slow tracking signal 119, indicating irregular occurrences of the step changes in ac current, such as associated with an arcing fault, a charge pulse 137 with an amplitude which is a function of the amplitude of the pulses in the sensed current signal and, therefore, the amplitude of the arcing current is generated. A time attenuated accumulation of these charge pulses 137 is maintained on the capacitor 139 shunted by the resistor 141. When the voltage on the capacitor 139 falls to a selected value, the comparator 63 generates an output signal indicative of an arcing fault. By relating the size of the charge pulses 137 to the amplitude of the step increases in the ac current, the sensitivity of the detector to low current arcing faults is increased. At the same time, the response to large arcing faults is maintained as the larger charge pulses generated by such arcs will accumulate faster.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Apparatus for detecting arcing faults in an ac electrical system, said apparatus comprising:

current sensing means generating a signal containing a current pulse for each step increase in current of at least a predetermined amplitude detected in said ac electrical system, said current pulses having an amplitude which is a function of the amplitude of said step increase;

randomness detecting means for detecting randomness in said current pulses and comprising first tracking means with a first time constant integrating said current pulses to generate a first tracking signal, and second tracking means with a second time constant shorter than said first time constant integrating said current pulses to generate a second tracking signal, and means generating a charge pulse having a value which is a function of the amplitude of a most recent of said step increases in current when the second tracking signal falls to a selected fraction of said first tracking signal; and output means maintaining a time attenuated accumulation of said charge pulses and generating an arcing fault indication when said time attenuated accumulation reaches a predetermined value.

2. The apparatus of claim 1 wherein said means generating said charge pulses comprises means responsive to said first tracking signal and said second tracking signal and generating said charge pulse as a function of the amplitude of said first tracking signal at the time that said second tracking signal falls below said predetermined fraction of said first tracking signal.

3. The apparatus of claim 2 wherein said means responsive to said first tracking signal and said second tracking signal comprises means comparing said second tracking signal to said first tracking signal and generating a first output when said second tracking signal is more than said predetermined fraction of said first tracking signal, and a second output when said second tracking signal falls below said fraction of said first tracking signal, and charge pulse means generating said charge pulse as a function of the amplitude of said first tracking signal when said comparing means generate said second output.

4. The apparatus of claim 3 wherein said charge pulse means comprises means generating a signal with a step change with an amplitude proportional to the amplitude of said first tracking signal when said comparing means switches from said first output to said second output, and high pass filter means generating said charge pulse from said step change.

5. The apparatus of claim 4 wherein said output means comprises a capacitor, adjusting means charging said capacitor at a predetermined rate, and a switch responsive to said charge pulse to apply said charge pulse to draw charge from said capacitor, and means generating said arcing fault indication when voltage on said capacitor falls to said predetermined value.

6. The apparatus of claim 2 wherein said output means comprises a capacitor, means applying said charge pulse to said capacitor, means adjusting charge on said capacitor at a selected rate in opposite sense from the charge pulses, and means generating said arcing fault indication when the voltage on said capacitor reaches said predetermined value.

* * * * *